US012794901B2

(12) United States Patent
Palan et al.

(10) Patent No.: US 12,794,901 B2
(45) Date of Patent: Nov. 10, 2026

(54) USER VERIFICATION SYSTEMS AND METHODS

(71) Applicant: Innovation Technologies Partners LP, Austin, TX (US)

(72) Inventors: Vivek Palan, San Francisco, CA (US); Jarl Nilsson, Mountain View, CA (US)

(73) Assignee: Innovation Technologies Partners LP, Austin, TX (US)

(*) Notice: Subject to any disclaimer, the term of this patent is extended or adjusted under 35 U.S.C. 154(b) by 59 days.

(21) Appl. No.: 18/898,453

(22) Filed: Sep. 26, 2024

(65) Prior Publication Data

US 2025/0168174 A1 May 22, 2025

Related U.S. Application Data

(63) Continuation of application No. 18/079,866, filed on Dec. 12, 2022, now Pat. No. 12,244,608, which is a continuation of application No. 16/664,420, filed on Oct. 25, 2019, now Pat. No. 11,539,713.

(60) Provisional application No. 62/751,107, filed on Oct. 26, 2018.

(51) Int. Cl.

| | |
|---|---|
| ***H04L 9/40*** | (2022.01) |
| ***H04L 9/32*** | (2006.01) |
| *G06V 40/40* | (2022.01) |

(52) U.S. Cl.

CPC .......... *H04L 63/123* (2013.01); *H04L 9/3247* (2013.01); *G06F 2221/2133* (2013.01); *G06V 40/40* (2022.01); *H04L 2463/144* (2013.01)

(58) Field of Classification Search

CPC ................ H04L 63/123; H04L 9/3247; G06F 2221/2133

See application file for complete search history.

(56) References Cited

U.S. PATENT DOCUMENTS

| | | | |
|---|---|---|---|
| 6,332,193 | B1 | 12/2001 | Glass et al. |
| 8,056,129 | B2 | 11/2011 | Gusier et al. |
| 8,126,816 | B2 | 2/2012 | Mu et al. |
| 8,935,176 | B2 | 1/2015 | Willner et al. |
| 9,106,695 | B2 | 8/2015 | Kaminsky |

(Continued)

OTHER PUBLICATIONS

Dave—Measuring, fingerprinting and catching click-spam in ad networks. Published May 2013.

(Continued)

*Primary Examiner* — Robert B Leung

(74) *Attorney, Agent, or Firm* — John P. Davis; Thayne and Davis LLC

(57) ABSTRACT

This disclosure relates to systems and methods for verifying the presentation of content to a target audience using generated metrics indicative of a likelihood that the content was presented to actual human individuals within the target audience. In some instances, such a metric may be associated with a probability model estimating that a user (e.g., a user of a device) is human and not a bot and/or other automated service. Metrics consistent with aspects of the disclosed embodiments may be generated based, at least in part, on user information received from a user and/or associated devices and/or associated services. Consistent with various disclosed embodiments, metrics indicative of whether a user is human, content distribution decisions and user agency decisions may use such metrics.

17 Claims, 9 Drawing Sheets

(56) References Cited

U.S. PATENT DOCUMENTS

| | | | | |
|---|---|---|---|---|
| 9,639,699 | B1 | 5/2017 | Kurupati | |
| 9,807,092 | B1 | 10/2017 | Gutzmann | |
| 10,044,725 | B2 | 8/2018 | Malenfant et al. | |
| 10,257,229 | B1 | 4/2019 | Kuo et al. | |
| 10,284,530 | B1* | 5/2019 | Kuo | G06F 21/85 |
| 2005/0105734 | A1 | 5/2005 | Buer et al. | |
| 2006/0036864 | A1 | 2/2006 | Parulski et al. | |
| 2008/0281606 | A1 | 11/2008 | Kitts et al. | |
| 2009/0210937 | A1 | 8/2009 | Kraft et al. | |
| 2009/0319270 | A1 | 12/2009 | Gross | |
| 2011/0113147 | A1 | 5/2011 | Poluri | |
| 2012/0183270 | A1 | 7/2012 | Greenblatt et al. | |
| 2012/0246737 | A1 | 9/2012 | Paxton et al. | |
| 2012/0290526 | A1 | 11/2012 | Gupta et al. | |
| 2012/0323694 | A1 | 12/2012 | Lita et al. | |
| 2013/0110648 | A1* | 5/2013 | Raab | G06Q 30/0241 705/14.73 |
| 2014/0085050 | A1 | 3/2014 | Luna | |
| 2014/0108810 | A1 | 4/2014 | Chenna | |
| 2015/0156084 | A1 | 6/2015 | Kaminsky et al. | |
| 2015/0264572 | A1 | 9/2015 | Turgeman | |
| 2015/0281263 | A1* | 10/2015 | McLaughlin | G06Q 30/0248 726/22 |
| 2015/0288694 | A1 | 10/2015 | Liebl, III et al. | |
| 2015/0310196 | A1* | 10/2015 | Turgeman | H04W 12/06 726/19 |
| 2016/0189151 | A1 | 6/2016 | He | |
| 2016/0191540 | A1 | 6/2016 | Fuka | |
| 2017/0034183 | A1 | 2/2017 | Enqvist et al. | |
| 2017/0161490 | A1 | 6/2017 | Fedor | |
| 2017/0185758 | A1* | 6/2017 | Oliker | G06F 21/316 |
| 2018/0189471 | A1 | 7/2018 | Paluri | |
| 2018/0239955 | A1 | 8/2018 | Rodriguez et al. | |
| 2018/0310171 | A1* | 10/2018 | Whitaker | H04W 12/06 |
| 2019/0007523 | A1 | 1/2019 | Walker et al. | |
| 2023/0110066 | A1 | 4/2023 | Palan et al. | |

OTHER PUBLICATIONS

ArsTechnica—The secret lives of Google raters. Annalee Newitz. Published Apr. 27, 2017.

Uzum E, Chung SP, Essa I, Lee W rtCaptcha: A Real-Time Captcha Based Liveness Detection System. In NDSS Feb. 18, 2018.

Non-Final Office Action dated Sep. 15, 2021 in U.S. Appl. No. 16/664,420.

Final Office Action dated Apr. 4, 2022 in U.S. Appl. No. 16/664,420.

Notice of Allowance dated Aug. 26, 2022 in U.S. Appl. No. 16/664,420.

Notice of Allowance dated Oct. 28, 2024, issued in U.S. Appl. No. 18/079,866.

Notice of Allowance dated Jun. 26, 2024, issued in U.S. Appl. No. 18/079,866.

Final Office Action dated Feb. 14, 2024, issued in U.S. Appl. No. 18/079,866.

Non-Final Office Action dated Sep. 8, 2023, issued in U.S. Appl. No. 18/079,866.

* cited by examiner

USER VERIFICATION SYSTEMS AND METHODS

RELATED APPLICATION

This application is a continuation of U.S. application Ser. No. 18/079,866, filed Dec. 12, 2022, and entitled "User Verification Systems and Methods," which is a continuation of U.S. application Ser. No. 16/664,420, filed Oct. 25, 2019, and entitled "User Verification Systems and Methods," which claims the benefit of priority under 35 U.S.C. § 119(e) to U.S. Provisional Patent Application No. 62/751,107, filed Oct. 26, 2018, and entitled "Advertisement Verification Systems and Methods," all of which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for verifying the presentation of content and/or advertisements to a target audience. More specifically, but not exclusively, the present disclosure relates to systems and methods for verifying the presentation of content and/or advertisements to a target audience using generated metrics indicative of a likelihood that the advertisements were presented to actual human individuals within a target audience Content is increasingly being consumed by users using a variety of personal electronic devices including, for example, smartphones, tablets, laptop computers, streaming media devices, TVs and/or the like. With the proliferation of content consumption using personal electronic devices, opportunities to monetize content consumption and/or otherwise compensate content creators, publishers, and/or distributors are becoming increasingly important. Rendering advertisements in connection with content is one relatively common way of monetizing content consumption.

In certain instances, however, advertisements delivered to devices may not be viewed by actual humans within a target audience. For example, fraudsters may create complex systems and/or bots that mimic human behavior and are intended to maximize advertisement revenue by tricking advertisement delivery and management systems into determining that advertisements delivered to devices are being viewed by actual individuals when it is not necessarily the case. Even if fraudsters are successful in siphoning off a small amount of advertising dollars, given the significant advertising expenditures by larger advertisers, fraudsters may still realize a relatively high return on their efforts.

As users interact with personal electronic devices, including mobile electronic devices, the Internet, and other connected services (e.g., content services), various information relating to the users may be collected. In certain embodiments, such information may be directly provided by a user. Information may be volunteered by a user as part of a device and/or service registration process. In further embodiments, information may be obtained by monitoring a user's interaction with devices and/or services (e.g., sensor information, usage information, etc.). Various volunteered and/or collected information related to a user may, in certain instances, be generally referred to herein as user and/or device information and/or data.

Consistent with embodiments disclosed herein, user and/or device information and/or data may be used to generate a metric initiative of the likelihood that an advertisement rendered on a device was presented to an actual human. Such a metric may generally be referred to herein as a Turing score. In certain embodiments, the disclosed systems and methods may help ameliorate certain problems relating to fraudulent advertisement consumption activities. Specifically, by using metrics consistent with embodiments disclosed herein, advertisers may more readily verify that their advertisements are presented to actual humans within a target audience and compensate associated content creators, services, and/or other platforms accordingly.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
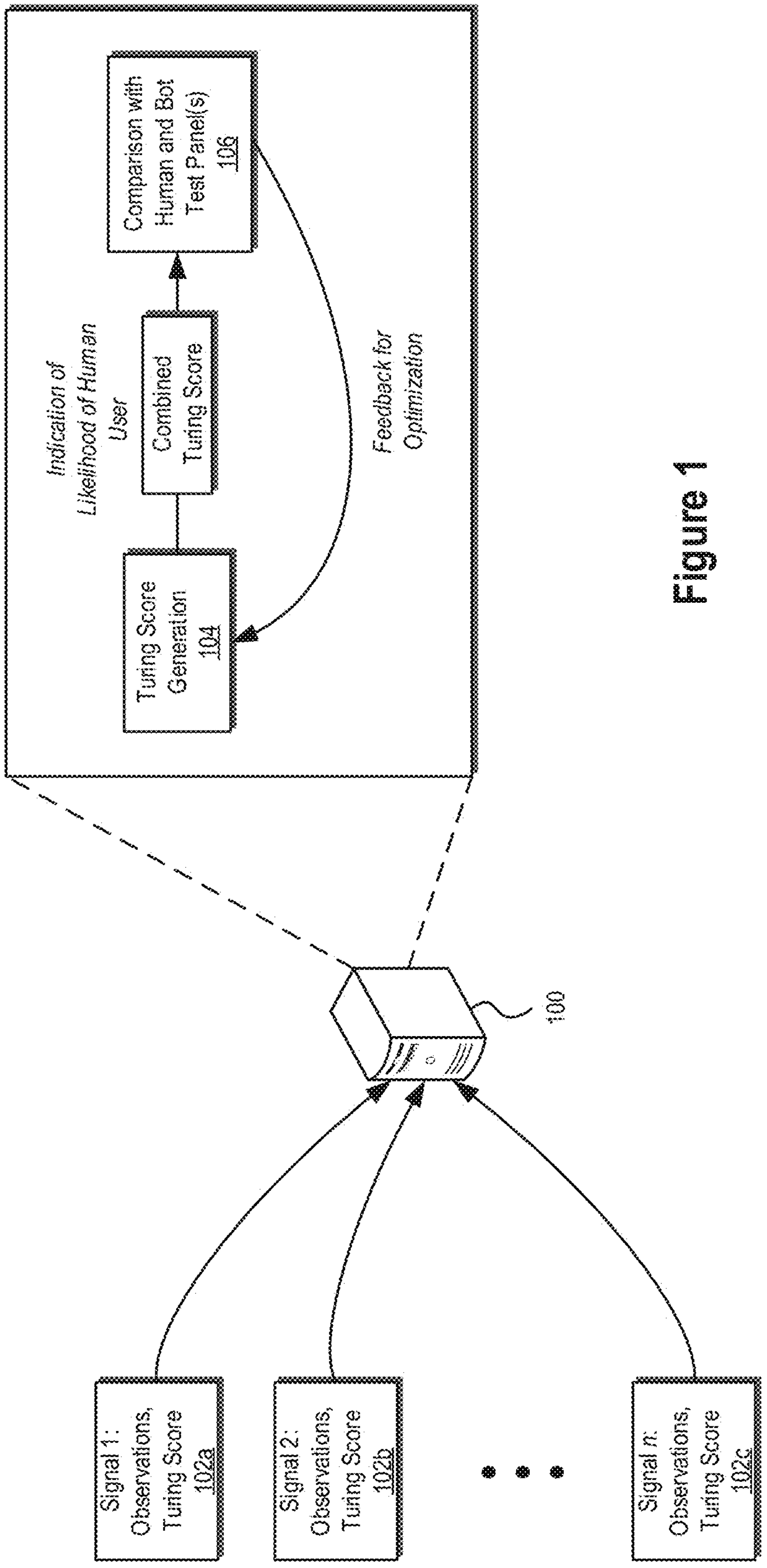
FIG. 1 illustrates an example of Turing score generation consistent with certain embodiments of the present disclosure.

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

As users interact with personal electronic devices and/or services, including mobile electronic devices, the Internet, and other connected services (e.g., advertisement content services), various information relating to the users may be collected. In certain embodiments, such information may be directly provided by a user. For example, a user may provide certain information as part of a device and/or service registration process, in response to one or more queries associated with an authentication process, and/or the like. In further embodiments, information may be obtained by monitoring a user's interaction with devices and/or services (e.g., sensor information, device and/or application usage information, etc.).

Collected user information may identify and/or otherwise infer a variety of information relating to a user. For example, user information may be collected related to a user that may identify and/or be used to infer a user's gender, age, ethnicity, residence, place of employment and/or occupation, salary, content interests, relationship status, and/or the like. Various user provided and/or otherwise volunteered and/or collected information related to a user may, in certain instances, be generally referred to herein as user and/or device information and/or data.

Information relating to a user may be used in a variety of contexts. For example, consistent with various aspects of the disclosed embodiments, information relating to a user and/or a device and/or service associated with the user may be used in connection with determining a likelihood an advertisement rendered on a device was presented to an actual human. By using certain generated user metrics consistent with embodiments disclosed herein, advertisers may more readily verify that their advertisements are presented to actual humans within a target audience and compensate associated content creators, services, and/or other platforms accordingly.

In various embodiments, a metric indicative of a likelihood that a user of a device is an actual human may comprise a Turing score associated with the user and/or device. A Turing score consistent with various aspects of the disclosed embodiments may comprise a metric associated with a probability model estimating that a user (e.g., a user of a device) is human. Turing scores may be generated based, at least in part, on user information received from a user and/or associated devices and/or services.

In certain embodiments, each Turing score may be associated with an anonymized identifier that may be associated with devices that may be used to interact with services (e.g., content services) in exchange for rendering advertisements. Multiple devices may be linked together with a common identity through a common account (e.g., via OAuth, logging in with a common social media account, and/or the like). In some embodiments, user information collected from multiple devices associated with a user and/or services may be aggregated to generate an aggregated Turing score associated with the user and/or the devices.

Turing scores may be provided to advertisers for use in a variety of contexts. For example, Turing scores may be sold to advertisers similar to the way credit scores are sold to lenders. Advertisers may incorporate the use of Turing scores in connection with programmatic advertisement bidding strategies. Content publishers may integrate SDKs into associated device applications, thereby providing a measure to trust to advertisers that their advertisements may be delivered to targeted individuals by the content publishers with relatively minimal if any fraud. In certain embodiments, the security of each device's observations used in connection with Turing score generation may be secured via public-provide key signature protocols.

FIG. 1 illustrates an example of Turing score generation consistent with certain embodiments of the present disclosure. In certain embodiments, a user verification system 100 and/or service may be communicatively coupled with one or more user devices and/or services associated with a user. The user devices may comprise one or more personal electronic devices, mobile devices, laptop computers, desktop computers, set top boxes, wearable electronic appliances, and/or any other type of electronic and/or system device associated with a user. In some embodiments, the user verification system 100 may be a part of and/or be otherwise associated with an advertisement and/or content service.

The user verification system 100 and/or advertisement and/or content system may provide a variety of functions including, without limitation, distribution of content to user devices (e.g., via content downloads, content streams, and/or the like), advertisement management and distribution services including targeted advertisement services, and/or Turing score generation and/or management based on collected information relating to the user consistent with embodiments disclosed herein. Although certain embodiments described herein describe a single system 100, it will be appreciated that various functions of the user verification system 100, which may include functions relating to Turing score generation and/or management and/or user verification and/or functions relating to the distribution of content and/or advertisements to a user device, may be performed by any number of suitable systems in any suitable combination. For example, a first system may provide functions relating to the distribution of content and/or advertisements to a user device (e.g., a dedicated advertisement and/or content service) and a second system may perform various functions relating to Turing score generation and management (e.g., a dedicated user verification system).

The user verification system 100, user devices, and/or one or more other systems and/or services may be communicatively coupled using a variety of networks and/or network connections. In certain embodiments, the network may comprise a variety of network communication devices and/or channels and may utilize any suitable communications protocols and/or standards facilitating communication between the user verification system 100 and/or advertisement and/or content service, user device, and/or one or more other systems and/or services. The network may comprise the Internet, a local area network, a virtual private network, and/or any other communication network utilizing one or more electronic communication technologies and/or standards (e.g., Ethernet or the like). In some embodiments, the network may comprise a wireless carrier system such as a personal communications system ("PCS"), and/or any other suitable communication system incorporating any suitable communication standards and/or protocols. In further embodiments, the network may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network may incorporate one or more satellite communication links. In yet further embodiments, the network may utilize IEEE's 802.11 standards, Bluetooth®, ultra-wide band ("UWB"), Zigbee®, and or any other suitable standard or standards.

The user verification system 100, user devices, and/or one or more other systems and/or services comprise a variety of computing devices and/or systems, including any computing system or systems suitable to implement the systems and methods disclosed herein. The connected devices, services, and/or systems may comprise a variety of computing devices and systems, including laptop computer systems, desktop computer systems, server computer systems, distributed computer systems, smartphones and/or other mobile devices, tablet computers, and/or the like.

In certain embodiments, the user verification system 100, user devices, and/or one or more other systems and/or services (e.g., a content mapping service) may comprise at least one processor system configured to execute instructions stored on an associated non-transitory computer-readable storage medium. As discussed in more detail below, the user verification system 100, user devices, and/or one or more other systems and/or services may further comprise a secure processing unit ("SPU") configured to perform sensitive operations such as trusted credential and/or key management, user information management, secure policy management, and/or other aspects of the systems and methods disclosed herein. The user verification system 100, user devices, and/or one or more other systems and/or services may further comprise software and/or hardware configured to enable electronic communication of information between the devices, services, and/or systems via the network using any suitable communication technology and/or standard.

As illustrated in connection with FIG. 1, the user verification system 100 may receive a plurality of signals 102*a*-102*c* from one or more devices and/or services associated with a user. The received signals 102*a*-102*c* may comprise various user and/or device information and/or data, including any of the types of information described herein. For examples, the received signals may comprise information directly provided by a user and/or information obtained by monitoring a user's interaction with devices and/or services.

In certain embodiments, each signal 102*a*-102*c* may be received from a separate user device and/or service. In further embodiments, a plurality of signals may be received from a single device and/or service. For example, a first signal may be received from a first application executing on a device, and a second signal may be received from a second application executing on the device.

In certain embodiments, each signal 102*a*-102*c* may be associated with a Turing score. For example, a signal 102*a*-102*c* may include observations associated with a user and/or a device. The observations may be analyzed to determine a Turing score metric associated with a probability model estimating that a user of an associated device is human based on the observations. In certain embodiments, received signals 102*a*-102*c* may comprise an associated Turing score. In further embodiments, information included in received signals 102*a*-102*c* (e.g., observations) may be used to generate and/or otherwise derive an associated Turing score.

Signals 102*a*-102*c* received by the user verification system 100 may be processed and/or otherwise analyzed to generate associated Turing score information by a Turing score generation module 104 executing on the user verification system 100. For example, one or more observations included in the signals 102*a*-102*c* may be used to generate a Turing score associated with of the signals 102*a*-102*c*. In further embodiments, observations included in a number of signals 102*a*-102*c* may be analyzed to generate a single Turing score associated multiple associated signals 102*a*-102*c*. In additional embodiments, as described above, received signals 102*a*-102*c* may comprise associated Turing scores.

Multiple signals 102*a*-102*c* associated with a single device and/or user may be aggregated and used by the Turing score generation module 104 to generate a combined Turing score associated with the device and/or user. In some embodiments, the signals 102*a*-102*c* may be weighted and/or adjusted over time in connection with generating a combined Turing score generation based on the degree to which information included in the signals 102*a*-102*c* is indicative of whether an associated user is an actual human.

In some embodiments, signals 102*a*-102*c* and/or associated generated Turing scores may be compared using a comparison module 106 executing on the user verification system 100 with signal data and/or Turing scores associated with panel data and/or confirmed human data and/or artificially generated data (e.g., data generated by bots and/or the like). Feedback information generated based on this comparison may be provided to the Turing score generation module 104 for use in generating Turing scores that more accurately identify a likelihood that a user associated with a signal and/or group of signals 102*a*-102*c* is an actual human. For example, signals 102*a*-102*c* and/or associated Turing scores may be adjusted over time for better accuracy based on a comparison of underlying signal data with panel data and/or confirmed human data.

As described above, a number of different types of received signals 102*a*-102*c* and/or constituent information may be used in generating associated Turing scores. For example, information provided from social media services such as a social media graph, third party datasets, user interaction (e.g., via occasional direct interaction with a user in connection with and/or alternative to advertisement rendering) including user "fingerprints" generated based on user interaction (e.g., typing cadence, pointer click timing in connection with interactive activities, etc.), and/or other information and/or messages obtained devices proximate to a user and/or an associated device may be used in connection with generating Turing scores associated with a user and/or an associated device.

In some embodiments, signals 102*a*-102*c* may comprise measured signal information. For example, as discussed above, measured user inputs and/or other information such as typing cadence, pointer click and/or movement timing and/or behavior, and/or the like, may be used in generating Turing scores. Further examples of measured information that may be used in connection with generating Turing scores may include, without limitation, one or more of an average speed and/or pace measured by a positioning sensor of a mobile device (e.g., a GPS sensor and/the like), website browsing behavior that, in some instances, may be evaluated at a particular point in time (e.g., viewing a particular website at a particular time and/or the like), interaction with other connected devices (e.g., a connected appliance, lamp, voice-enabled devices, etc.), energy consumed by a user and/or associated devices (e.g., a relative amount of energy consumed by a user compared to a threshold for a particular community, user, and/or segment) and/or the like.

More complex signals may be derived and/or otherwise generated based on one or more other signals. For example, in some instances, two or more unrelated users with similar behavior patterns and/or patterns that are similar within some degree of significance may be determined less likely to be human, as behavior patterns of unrelated actual human users may tend to diverge. Accordingly, such signal information may be used to generate relatively lower Turing scores for some and/or all of the subject unrelated users. In this manner, signals associated with a user may be used in connection with signals associated with other users to generate associated Turing scores for the user and/or other users.

Further embodiments may use signals 102*a*-102*c* that are extracted and/or otherwise generated through comparative analysis processes. For example, in some embodiments, comparative analysis may be performed with panel data from validated human generated signals and/or observations and artificially generated signals and/or observations from a bot. This information may be used to identify signals which may be indicative of a relative likelihood a user is human for use in generating associated Turing scores.

In some embodiments, user behaviors may change over time and/or upon the occurrence of certain events. For example, user behaviors and/or associated signal information may change with the occurrence of certain global events (e.g., holidays, recessions, gasoline shortages, etc.), weather events (e.g., hurricanes, etc.), life events (e.g., marriage, having children, retirement, etc.), and/or the like. Signals associated with actual humans are likely to change over time based on the occurrence of such events, whereas signals associated with non-human bots are less likely to change. Accordingly, a divergence over time (e.g., following occurrence of an event) between signals associated with a first group of users, that may experience changes in associated signals, and a second group of users, that may experience less and/or no changes in associated signals, may indicate that the first group of users is more likely to be human than the second group of users, and associated Turing scores may be adjusted accordingly.

It will be appreciated that a number of variations can be made to the architecture, relationships, and examples presented in connection with FIG. 1 within the scope of the inventive body of work. For example, certain device, system, and/or service functionalities described above may be integrated into a single device, system, and/or service, and/or any suitable combination of devices, systems, and/or services in any suitable configuration. Thus, it will be appreciated that the architecture, relationships, and examples presented in connection with FIG. 1 are provided for purposes of illustration and explanation, and not limitation.

Figure 2:
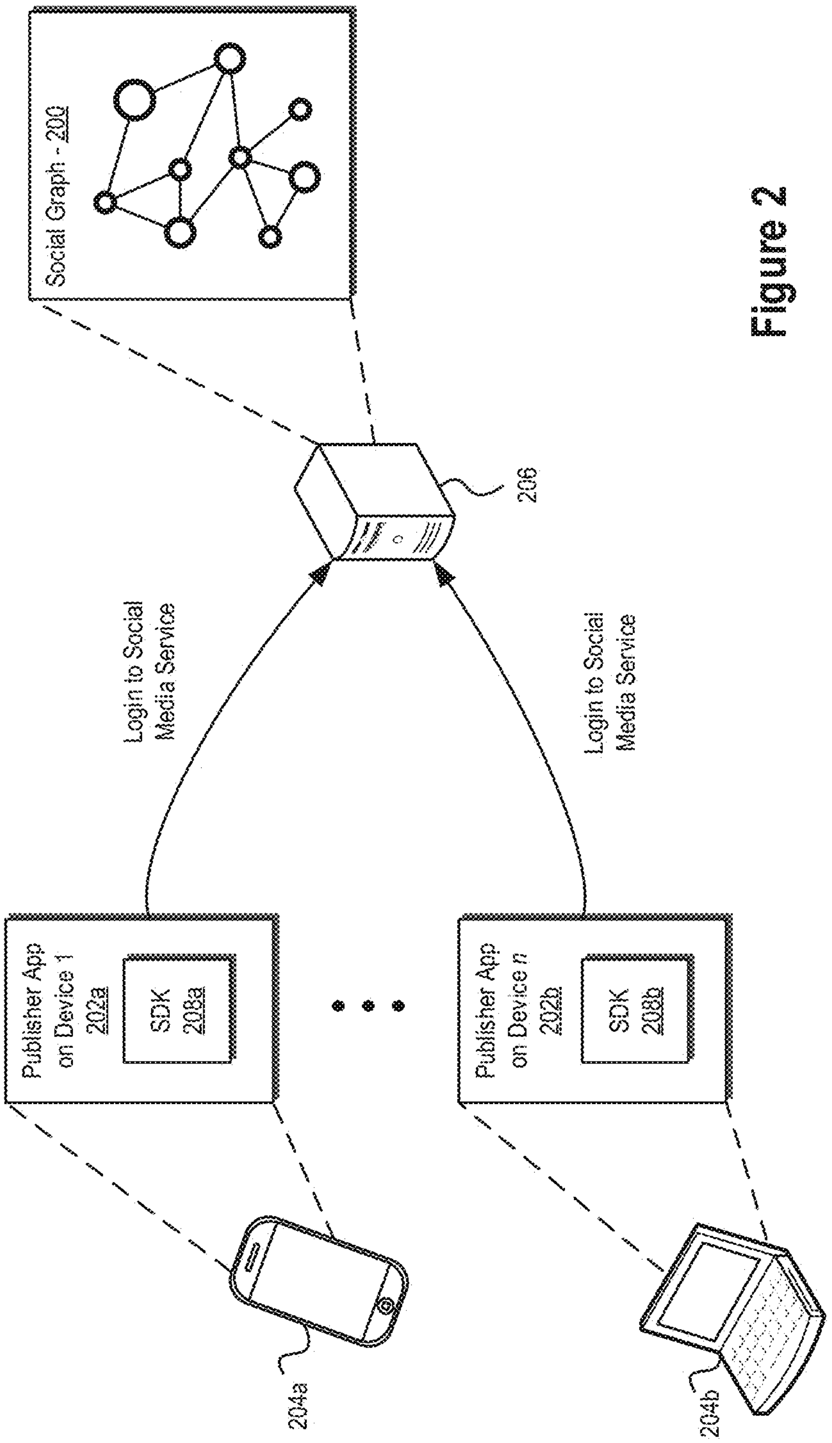
FIG. 2 illustrates an example of a social graph consistent with certain embodiments of the present disclosure.

In certain embodiments, information from social media services and/or associated applications, which may comprise a social graph, may be received as one or more signals used in connection with Turing score generation. FIG. 2 illustrates an example of a social graph 200 consistent with certain embodiments of the present disclosure. As illustrated, applications 202*a*, 202*b* executing on one or more user devices 204*a*, 204*b* may include functionality that allows for user login and/or authentication using credentials associated with a social media service 206. Such functionality may be deployed using SDKs 208*a*, 208*b*.

As an example, a common protocol such as Open Authentication protocol ("OAuth") may allow a user to use established credentials with one service to log into another service without having to create a separate account with the other service. For example, a user can use social media service credentials to log into the website of another service separate from the social media service. In some embodiments, application publishers may require that users of devices complete an OAuth authentication process to access application content. The established credentials may be shared with a user verification service and/advertisement and/or content service configured to generate Turing scores consistent with embodiments disclosed herein based on the same. Analyzing a social graph 200 associated with the user may provide an indication of the likelihood that a user's social connections are also human, which may influence the generated Turing score associated with the user (e.g., increasing the Turing score for the user as the likelihood that a user's social connections are human) increases. For example, a user with social connections reflected in a social graph 200 that are likely other humans will be more likely to be considered a human than a user with social connections reflected in the social graph 200 that are other entities and/or bot accounts and/or profiles.

In some embodiments, information from third-party data services may be received as one or more signals used in connection with Turing score generation. Advertisers may use third-party data services and/or associated data sets in connection with determining and/or otherwise identifying user interests. Such data sets may also be used to determine how similar a given user's inferred interests are anomalous with regard to a dataset.

Figure 3:
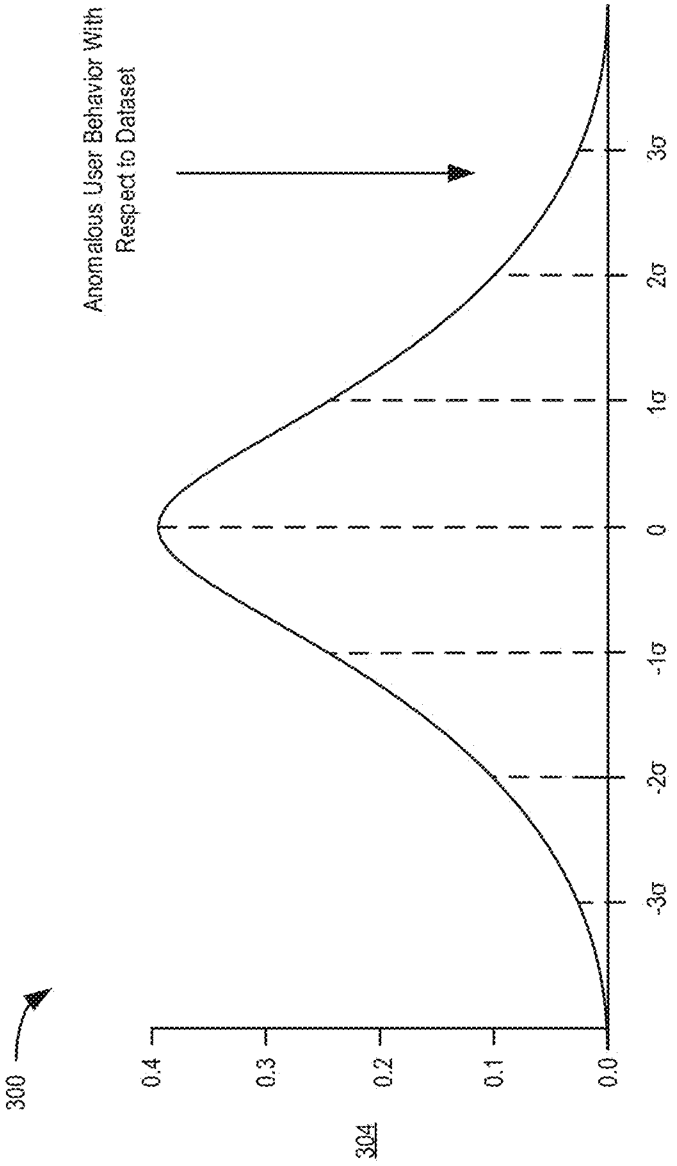
FIG. 3 illustrates an example of identification of anomalous user behavior consistent with certain embodiments of the present disclosure.

FIG. 3 illustrates an example of identification of anomalous user behavior within a dataset consistent with certain embodiments of the present disclosure. Specifically, FIG. 3 illustrates a graph 300 where the y axis 304 shows a measure of a behavior and/or an observation relative to a normalized distribution around a mean 304. For example, graph 300 may show a typing cadence and/or speed, a number of connections in a social graph, a relative speed and/or click speed to respond to a challenge query, and/or the like relative to a distribution. As shown, observations falling away from the mean (e.g., by a threshold amount) may be used to identify anomalous user behavior, which may indicate a user is less likely to be a actual human. A Turing score associated with the user may be adjusted accordingly.

User interests may be inferred based on received signal information and identified interests may be compared with a dataset. A Turing score associated with the user may be increased and/or decreased based on how anomalous the interests are relative to the dataset. For example, a Turing score associated with a user may be decreased as the user's inferred interests become more anomalous relative to a data set.

In further embodiments, information generated based on user interaction with a device, system, and/or service may be received as one or more signals used in connection with Turing score generation. For example, a user may be presented with an interactive question on a device. The user's entered response may be compared with the responses of other users. In certain embodiments, there may not necessarily be a single correct answer to the question. Rather, submitted answers to the question that are anomalous to a mean answer may be used to identify anomalous responses and/or associated users, and generated Turing scores may be influenced accordingly. In some embodiments, questions may be designed to provide enough response variance to identify and/or otherwise distinguish anomalous responses.

In other embodiments, interactions between a variety of devices associated with a user may be used in connection with generating Turing scores. For example, connected devices may exchange various messages and/or information to provide more personalized services to users. In certain circumstances, device manufacturers and/or associated services may partially subsidize the cost of these devices to end users by collecting and/or selling certain information associated with a user generated as a user interacts with devices.

Consistent with aspects of the disclosed embodiments, connected devices may exchange various information and/or messages when they are in proximity of each other (e.g., through various connections such as high frequency sounds, Bluetooth®, and/or the like). In some embodiments, each device may communicate a unique signal to other devices. For example, devices may be personalized with a private key (e.g., a private key stored in secure memory during manufacture). Messages originating from a device may be signed using the private key and may be verified by other devices based on the signature. A fraudster attempting to mimic this messaging behavior between devices would need to forge the unique signatures of multiple devices. As forgeries are likely to resemble each other, analyzing the messages exchanged between devices may be used to increase and/or lower a Turing score of a user associated with the devices.

Figure 4:
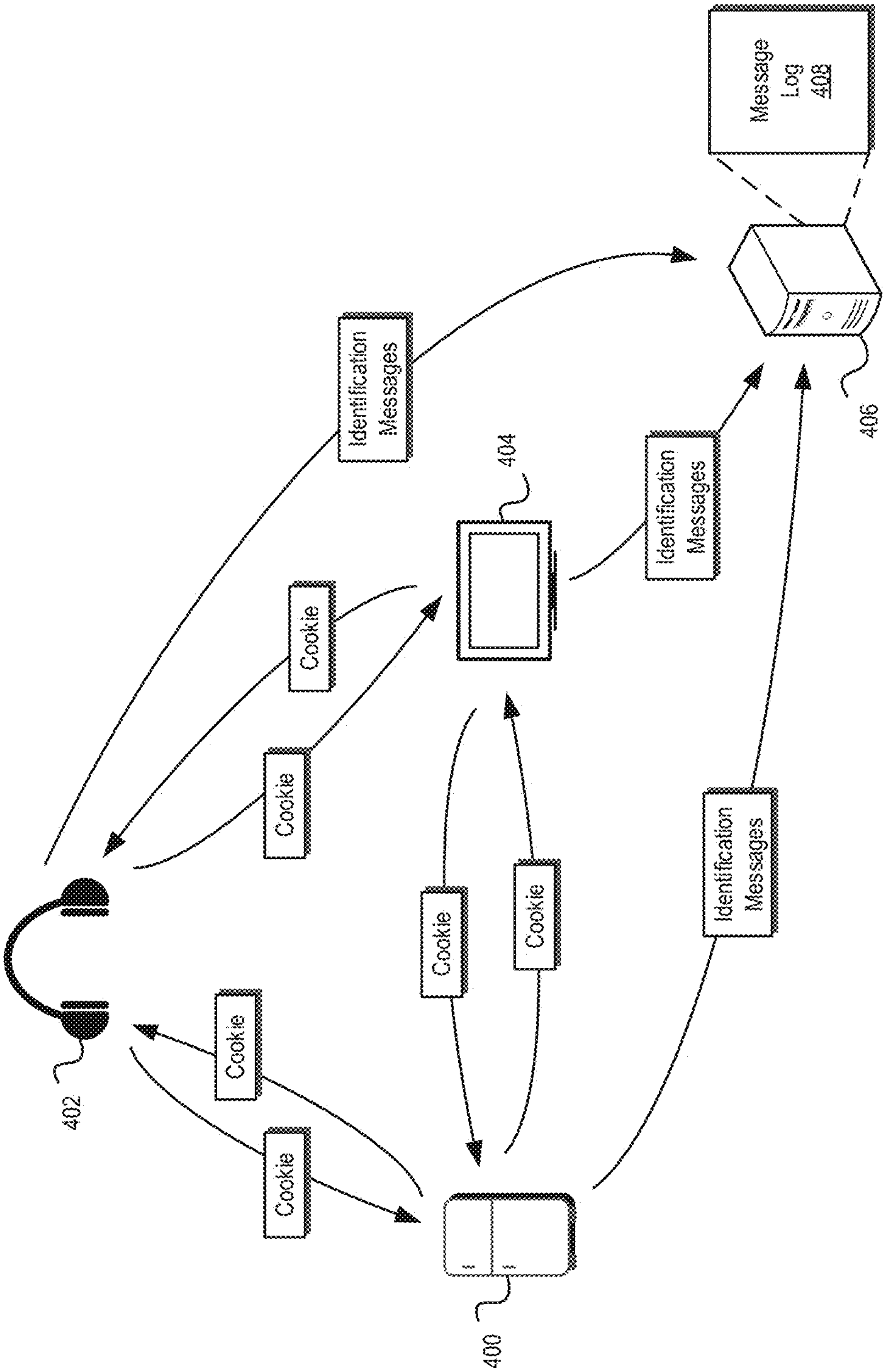
FIG. 4 illustrates an example of using messaging between a variety of devices associated with a user in connection with generating a Turing score consistent with certain embodiments of the present disclosure.

FIG. 4 illustrates an example of use of messaging between a variety of connected devices 400-404 (e.g., a connected wearable device 402, a connected appliance 400, a connected television display 404, etc.) associated with a user in connection with the generation of a Turing score consistent with certain embodiments of the present disclosure. As shown, various signed messages exchanged between devices may be communicated to and/or otherwise logged by a central service 406 (e.g., a user verification service and/or an advertisement and/or content service). Exchanged messages may comprise identification messages and/or device cookies. Aggregated messages included in an associated message log 408 managed by the central service 406 may be analyzed and used to generate associating Turing scores.

In certain embodiments, as devices interact, relatively small amounts of data, which may be referred to as herein as device messages, identification messages, device identification messages, and/or device cookies, may be exchanged. In some embodiments, the exchanged data may be signed by the private keys of originating devices, allowing the data to be authenticated as originating from a particular device. A variety of information may be included in device cookies including, without limitation, data useful in authenticating that a user is associated with a device is human. Such information may include, for example, one or more of a date and/or time, a location (e.g., a location as known by the device), observation taxonomy (e.g., based on device sensor information such an indications of the speed of a user/device, user/device time in a particular location, biometric readings, etc.), and/or any other suitable information that may be used in connection with determining a likelihood that a user associated with a device is human. In some embodiments, a copy of a device cookie may be stored on user devices similar to the manner in which a web cookie is stored by a web browser.

Device cookies may be used in a variety of ways in connection with various aspects of the disclosed embodiments. For example, in some embodiments, software on user's devices may share device cookies with a central service 406 that may generate associated Turing scores for the user based on the shared device cookies. Aggregated device cookies may thus function as a sort of digital fingerprint associated with a user.

Device cookies may further be used in connection with the personalization of services based on observed preferences, to provide indications of certain user habits (e.g., habits for insurance pricing and/or healthcare monitoring), to provide user location monitoring (e.g., for use in connection with alibi and/or parole monitoring), and/or the like. In further embodiments, device cookies may be used in various security related methods. For example, similar to multifactor authentication using smartphones, a set of device cookies may be used to authenticate the identity of an individual by comparing more recent user behavior reflected in device cookies with prior verified user behavior.

Figure 5:
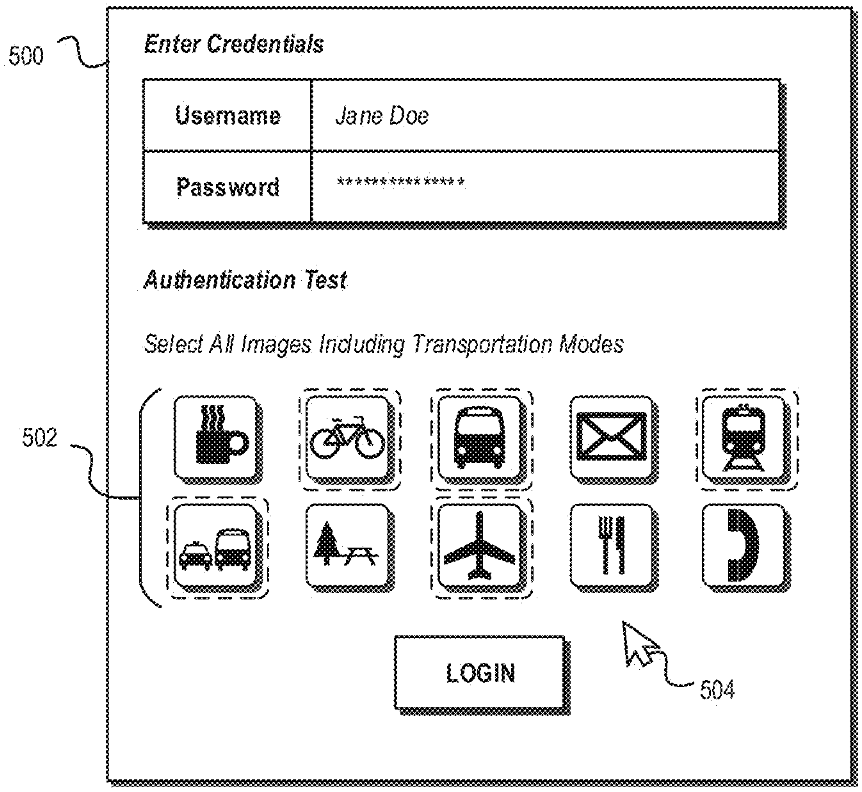
FIG. 5 illustrates an example of an interactive interface that may be used to generate signal information used in connection with Turing score generation consistent with certain embodiments of the present disclosure.

In some embodiments, information generated based on user interaction with a device, system, and/or service may be received by a user verification system and/or used as one or more signals in connection with Turing score generation. FIG. 5 illustrates an example of an interactive interface 500 that may be used to generate signal information used in connection with Turing score generation consistent with certain embodiments of the present disclosure. As shown in the example interface 500, a user may be presented with an interactive question and/or game which requests that the user to generate a response. In some embodiments, the interactive question and/or query may be presented, for example, in connection with a login authentication process.

In the illustrated example, a user may be queried to select one or more images from a group of images 502 meeting certain query parameters. For example, as illustrated, a user may be queried to select one or more images from the group of images 502 that show modes of transportation and/or travel using a cursor 504 (e.g., by clicking on images and/or the like) and/or another suitable input mechanism.

The user's entered response may be tracked and compared with the responses of other users, panels of verified human users, and/or panels of automated bots. A variety of parameters associated with the user's response may be tracked and/or otherwise analyzed. For example, a number of selected images that meet the queried parameters, a time to select the images, cursor movement, selection and/or click cadence, and/or any other parameter resulting from the user's interaction with the interface 500 may be tracked. These parameters may be compared with parameters associated with other users, verified human users, and/or automated bots, to determine whether a submitted response is anonymous relative to other human users. For example, if a tracked response indicates images were selected every 10 microseconds with no cursor path variance between images, it may be determined that the response was likely not generated by a human user as responses from verified human users may be associated with longer image selection times and increased cursor path variance during selection. In some embodiments, queries may be designed to provide enough response variance to identify and/or otherwise distinguish anomalous responses.

It will be appreciated that a variety of interactive queries may be presented to a user to solicit responses that may be used as one or more signals in connection with Turing score generation. For example, a variety of Turing tests may be presented to users that may solicit responses from users that may provide a variety of signal information including for example and without limitation, response correctness, response timing, cursor and/or pointer path variance during response, typing cadence associated with a response, and/or the like. In some embodiments, users may be compensated and/or otherwise rewarded for provided responses to interactive queries.

Figure 6:
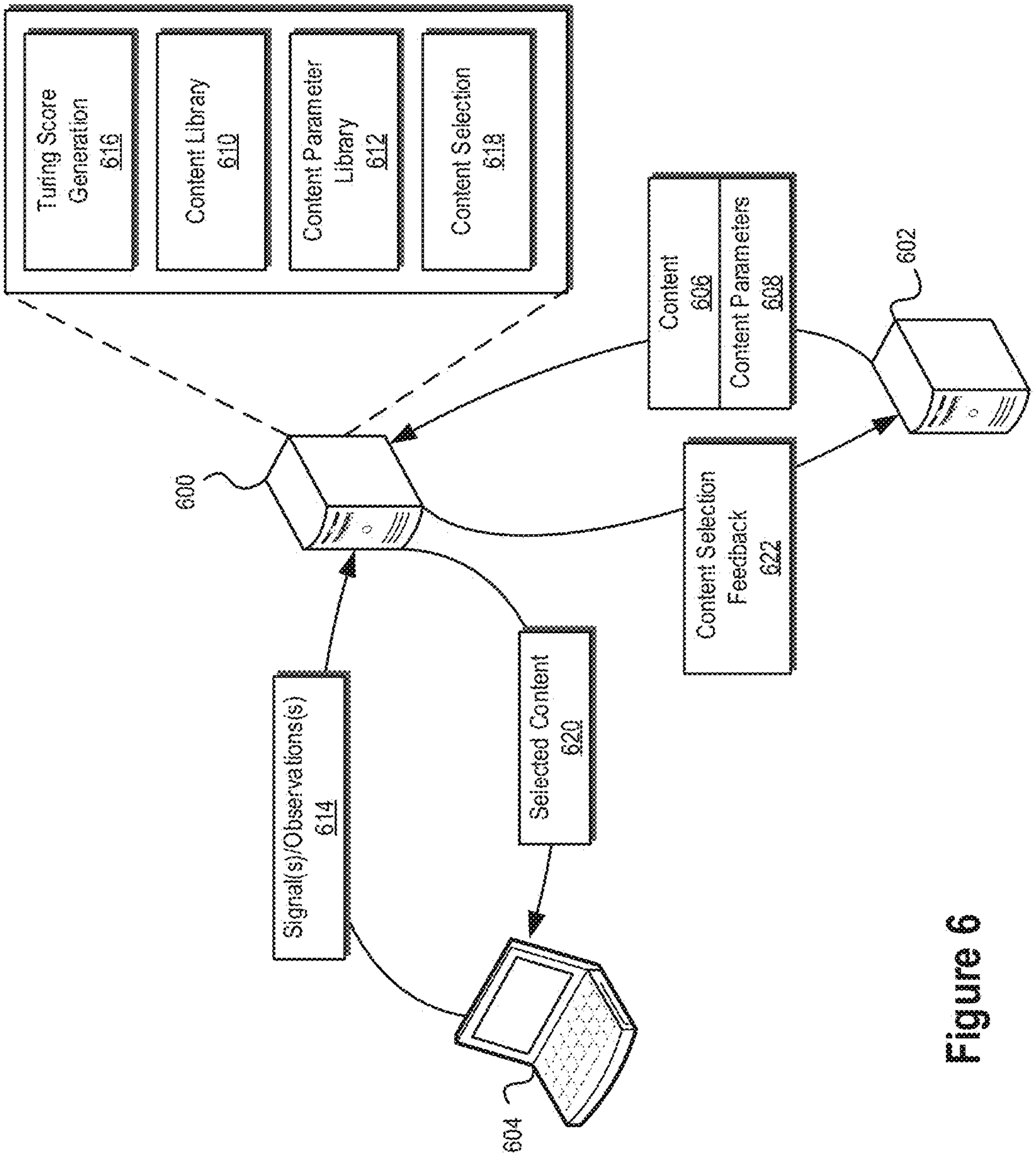
FIG. 6 illustrates an example of the use of Turing scores in connection with content delivery consistent with certain embodiments disclosed herein.

FIG. 6 illustrates an example of the use of Turing scores in connection with content delivery consistent with certain embodiments disclosed herein. A user verification system 600, which may implement functions associated with Turing score generation and/or management and/or content management and/or distribution including targeted content delivery as described herein, may be communicatively coupled with a content generation system 602 and a user device 604. Although the illustrated example shows a single system 600 implementing both Turing score generation and/or content management and/or distribution functionality, it will be appreciated that in other embodiments separate systems may be used to implement these and/or other services.

The content generation system 602 may provide the user verification system 600 with one or more content items 606 for distribution to one or more devices (e.g., device 604). A variety of content items 606 may be provided by the content generation system 602 including, for example, and without limitation, video content, image content, text content, audio content, advertisement content, and/or the like. Although described herein as a content generation system 602, it will be appreciated that in some embodiments, the system 602 may not necessarily generate content items 606 but instead may be an intermediate system configured to distribute the content items 606 to the user verification system 600.

In conjunction with and/or separately from the content items 606, the content generation system 602 may further provide the user verification system 600 with one or more content parameters 608. The content parameters 608 may articulate one or more conditions, requirements, and/or parameters related to the distribution of the content items 606 by the user verification system 600 and/or the rendering of content items 606 by user devices 604. For example, and without limitation, the content parameters 608 may articulate that the content items 606 should be distributed to devices 604 and/or associated users having certain threshold Turing scores (e.g., Turing scores exceeding defined thresholds set by the user verification system 600 and/or the content generation system 602), certain time periods during which the content items 606 should be distributed and/or presented to users and/or by user devices 604, certain information relating to remuneration and/or compensation to be paid by a service associated with the content generation system 602 and/or a service associated with the user verification system 600 for the distribution and/or rendering of content items 608 to users and/or devices 604 having certain threshold Turing scores, and/or the like.

Content items 606 received by the user verification system 600 may be stored and/or otherwise managed by the user verification system 600 in a content item library 610. Similarly, content parameters 608 received by the user verification system may be stored and/or otherwise managed by the user verification system 600 in a content parameter library 612. Although illustrated as separate libraries 610, 612, it will be appreciated that in other embodiments, content items and/or associated parameters may be stored in a single library (or any suitable number of libraries) managed by the user verification system 600 and/or another associated system and/or service.

One or more signals and/or observations 614 may be received by the user verification system 600 from the user device 604. As described herein, the received signals and/or operations 614 may comprise a variety of information including, for example and without limitation, information directly provided and/or otherwise volunteered by a user and/or information obtaining by monitoring a user's interaction with devices and/or services. In some embodiments, the received signals and/or observations 614 may comprise one or more Turing scores. In further embodiments, the received signals and/or observations 614 may include information that may be used to generate and/or otherwise derive associated Turing scores.

A Turing score generation module 616 may process and/or otherwise analyze the signals and/or observations 614 received from the user device 604 and be used to generate one or more Turing scores associated with the received signals and/or observations 614, the device 604, and/or an associated user. In some embodiments, comparison processes with panel data (e.g., validated human generated signals and/or observations and/or artificially generated signals and/or observations from a bot) may be used to refine generated Turing scores so that they more accurately identify a likelihood that a user associated with an observation and/or signal is an actual human.

A content selection module 618 may select one or more content items from the content library 610 for delivery to the user device 604 based, at least in part, on associated content parameters included in the content parameter library 612 and/or the Turing scores generated by the Turing score generation module 616. In some embodiments, the selected content item 620 may be delivered to the user device 604 by the user verification system 600.

In one example, a content creator may articulate a condition that their content be distributed to devices with users that are likely human. Accordingly, content parameters associated with a content item included in the content library 610 may specify that the content item should be distributed to devices having Turing scores above a certain defined threshold (e.g., a threshold articulated in the relevant content parameters). If the Turing score generation module 616 determines that the device 604 is likely associated with a human user and the corresponding generating Turing score meets and/or exceeds the threshold, the content selection module 618 may deliver the selected content item 620 to the user device 604. Although the above example describes use of a single Turing score threshold articulated in applicable content parameters, it will be appreciated that in other embodiments and/or examples, content parameters associated with content in the content library 610 may be articulate conditions associated with multiple Turing score thresholds.

In another nonlimiting example, content parameters may articulate information relating to remuneration and/or compensation to be paid for the distribution and/or rendering of advertisement content items to users and/or devices having certain threshold Turing scores. For example, parameters associated with advertisement content included in the content library 610 may articulate that a first compensation amount may be paid for distributing the advertisement to a user associated with a Turing score exceeding a first threshold, a second compensation amount lower than the first compensation amount may be paid for distributing the advertisement to a user associated with a Turing score exceeding a second threshold lower than the first threshold, and a third compensation amount lower than the second compensation amount may be paid for distributing the advertisement to a user associated with a Turing score exceeding a third threshold lower than the second threshold.

The content selection module 618 may evaluate such content parameters against generated Turing scores and distribute content from the content library 610 to users against an objective criteria. A variety of objective criteria may be used in connection with the disclosed embodiments. For example, the content selection module 618 may select content for distribution that maximizes compensation paid for the distribution of the content items and/or the like, content that meets a certain threshold distribution amount and/or objective (e.g., distribution to a certain number of devices and/or the like), content that has certain associated Turing score thresholds, and/or the like.

In some embodiments, the user verification system 600 may communicate feedback information 622 to the content generation system 602 indicative of selected content items 620 distributed to the user device 604. The feedback information 622 may include, for example and without limitation, indications relating to the selected content items 620, information relating Turing scores and/or associated signals and/or observations associated users and/or devices 604 receiving content 620 selected by the user verification system 600, compensation and/or remuneration information relating to the distribution of selected content 620 (e.g., amounts charged to a content creator and/or the like for the distribution of content), and/or the like.

It will be appreciated that a number of variations can be made to the architecture, relationships, and examples presented in connection with FIG. 6 within the scope of the inventive body of work. For example, certain device, system, and/or service functionalities described above may be integrated into a single device, system, and/or service, and/or any suitable combination of devices, systems, and/or services in any suitable configuration. Thus, it will be appreciated that the architecture, relationships, and examples presented in connection with FIG. 6 are provided for purposes of illustration and explanation, and not limitation.

Figure 7:
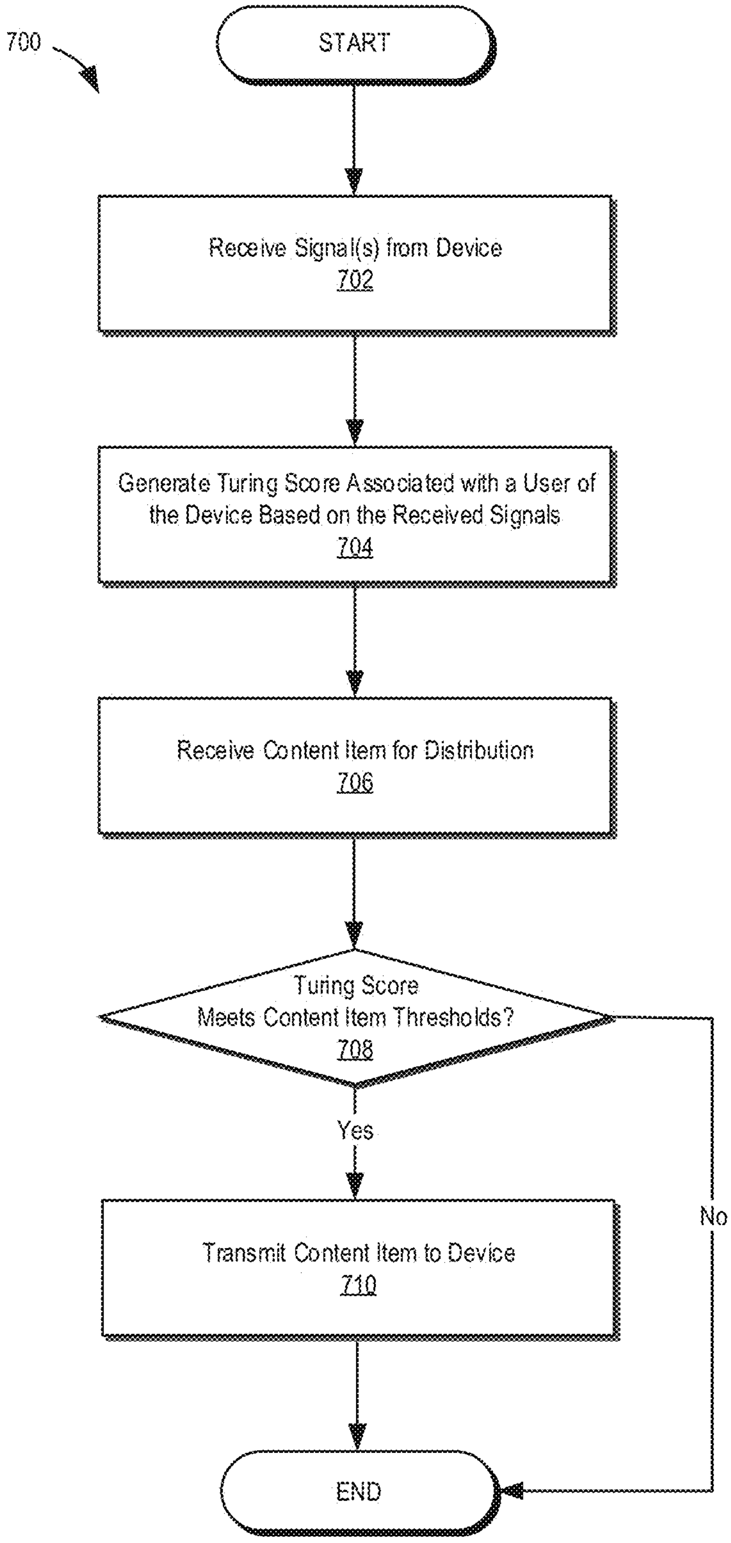
FIG. 7 illustrates a flow chart of an example of a method of using Turing scores consistent with certain embodiments disclosed herein.

FIG. 7 illustrates a flow chart of an example of a method 700 of using Turing scores consistent with certain embodiments disclosed herein. The illustrated method 700 may be implemented in a variety of ways, including using software, firmware, and/or any combination thereof. In certain embodiments, various aspects of the illustrated method 700 and/or its one or more of its constituent steps may be performed by a user verification system and/or service and/or any suitable combination of one or more services and/or computer systems.

At 702, one or more first signals may be received from a first device. In some embodiments, the one or more first signals may be associated with a user of the first device. Based on the received signals, a Turing score associated with the user of the first device may be generated at 704. Consistent with embodiments disclosed herein, the Turing score may indicate a relative likelihood that the user of the first device is an actual human user and not an automated bot (e.g., a score on a scale of 0-100 indicating a relatively likelihood that the user is an actual human and/or the like). In some embodiments, generating the Turing score may comprise comparing the received one or more signals to panel signal data to identify a relative degree deviation of the received one or more signals from the panel signal data.

A variety of signals may be used in connection with Turing score generation consistent with embodiments disclosed herein. In some embodiments, the signals may comprise user input provided by the user to the first device. For example, the signals may comprise user volunteered information and/or information generated based on a user's response to an interactive query and/or activity presented to the user on the first device.

In other embodiments, the one or more first signals may comprise information generated by monitoring a user's interaction with the first device. The one or more first signals may further comprise one or more identification messages (e.g., signed messages) received by the first device from one or more other devices. In some embodiments, the one or more identification messages may be received by the first device when the first device is proximate to the one or more other devices.

In certain embodiments, one or more second signals may be received from a second device that may be associated with a user of the first device, and the Turing score may be further generated based on the received one or more second signals. In this manner, aggregated signal information related to a user from multiple devices may be used to generate an associated Turing score.

At 706, a content item may be received for distribution that may be associated with at least one parameter associated with the distribution of the content item. For example, a content parameter may specify that a content item should be distributed to users and/or devices associated with a Turing score meeting and/or exceeding one or more specified thresholds.

The generated Turing score associated with the user of the first device may be compared with a threshold specified in the content parameter at 708. If the generated Turing score meets and/or otherwise exceeds the threshold, the content item may be transmitted to the device at 710.

Figure 8:
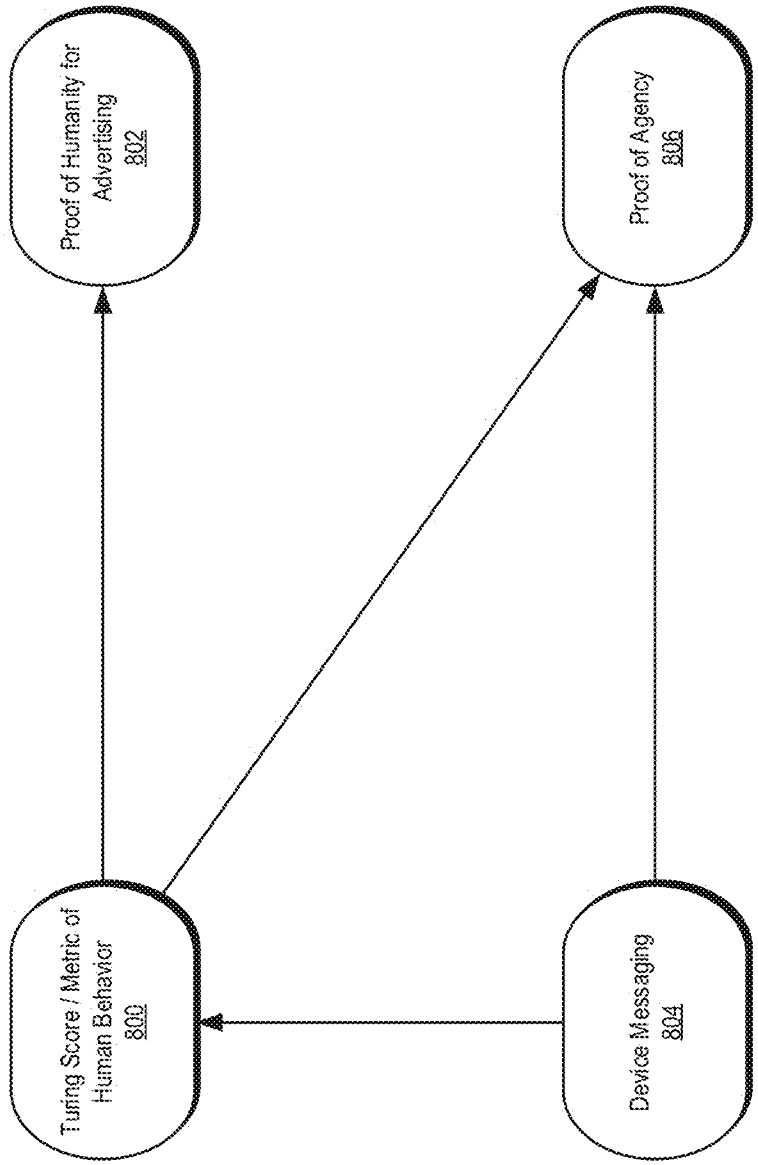
FIG. 8 illustrates a conventional diagram showing various examples of applications using Turing scores consistent with certain embodiments disclosed herein.

FIG. 8 illustrates a conceptual diagram showing various examples of applications of using Turing scores consistent with embodiments of the present disclosure. As disclosed herein, a metric indicative of a likelihood that a user is human, which may be referred to herein as a Turing score 800, may be used in a variety of contents. Conventional Turing tests may provide a binary result: Pass or Fail. In contrast, various embodiments of the disclosed systems and methods generate and/or use a relative probability score (e.g., a score on a scale of 0-100 and/or another non-binary indication) indicating an estimated likelihood that the associated user is human that may provide more a more granular relative indication of humanity than a more simplistic binary result Turing test.

Turing scores may be used in a variety of contexts and/or be generated using a variety of information and/or signals. As described herein, in some embodiments, Turing scores may be generated based on data collected from one or more devices associated with a user. In some embodiments, as devices interact (e.g., interact via WiFi and/or other proximity-based communication protocols) they may exchange a variety of messages (e.g., signed messages) that may provide a unique signature and/or figure print associated with a user 804. A bot impersonating a human (or a group of bots), however, may have difficulty generating signatures reflective of an actual human user, especially when signatures may only be generated when devices are in proximity to each other.

In certain embodiments, Turing scores may be used in connection with content and/or advertising distribution 802. For example, once a Turing score is generated for a subject user, the score can be used by advertisers and/or content providers to bid (e.g., bid at a discount and/or a premium) for an audience, in a similar manner to the way financial institutions use credit scores to determine interests rates in connection with loan underwriting. Such bidding may be done an audience level (e.g., by evaluating an average Turing score from a particular application, device, and/or group of users), and/or at an individual user level.

In further embodiments, user information may be used in connection with determining whether an autonomous agent is authorized to act on an individual's behalf and/or the extent to which it is authorized to act 806. In some embodiments, Turing scores may be used to provide a probability score than an autonomous agent is authorized to act on a specific human user's behalf. For example, if this probability is designated as p, then 1-p may provide the probability than an unauthorized bot is impersonating another authorized agent. As an example, there may be automated scripts that nefarious actors may use to try to access an individual's account without authorization. A user, however, may access their account using a valid software applications. In some embodiments, a Turing score may be used to trace a chain of authorization from an agent in question (e.g., a software application requesting account access) to the originator of the program and then compare identification message signatures with humans who it claims to be aiding.

Figure 9:
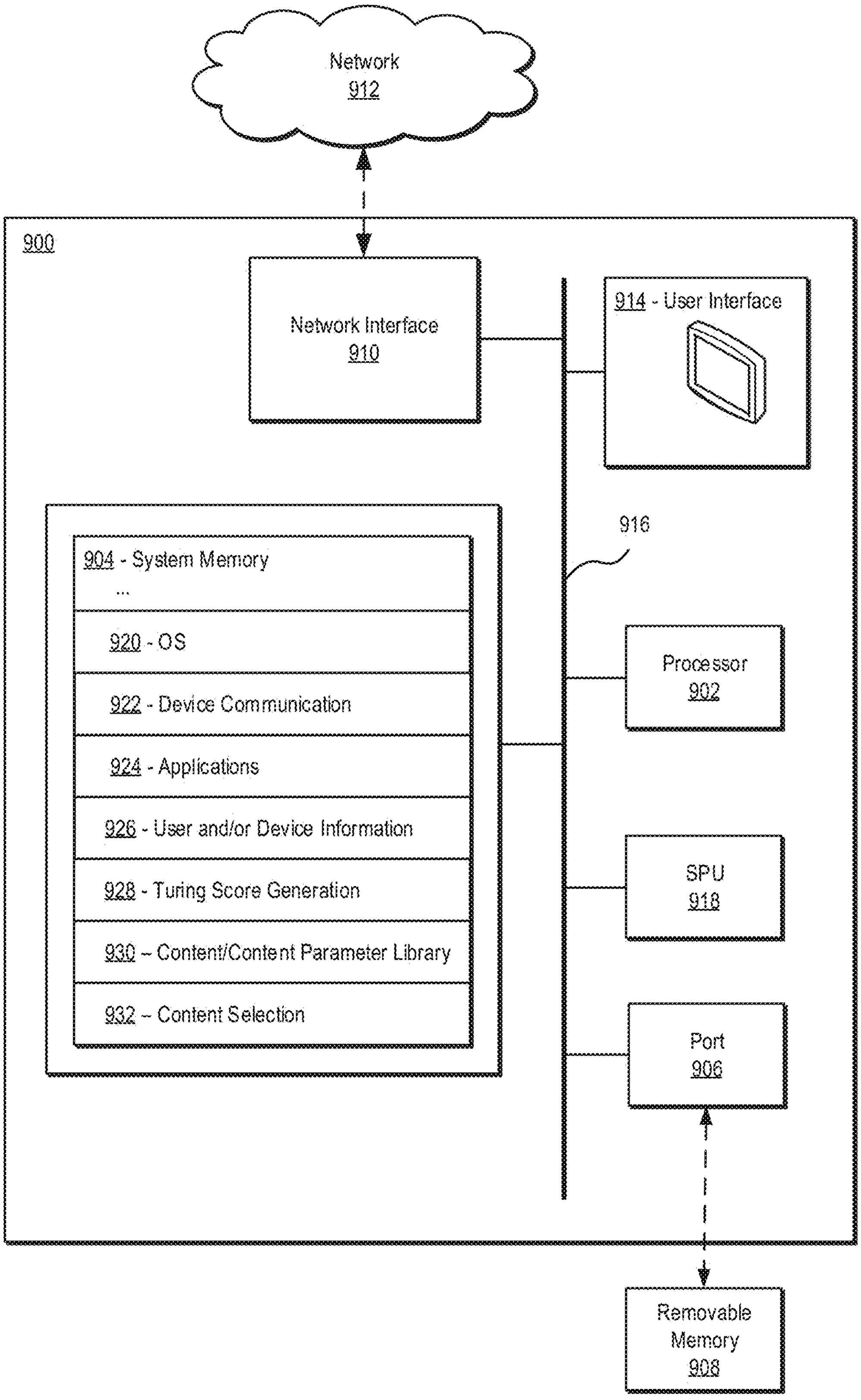
FIG. 9 illustrates a system that may be used to implement certain embodiments of the systems and methods of the present disclosure.

FIG. 9 illustrates a system 900 that may be used to implement certain embodiments of the systems and methods of the present disclosure. Various elements illustrated in the exemplary system 900 may be included in a system and/or device associated with a user, a user verification and/or content and/or advertisement service, a user information service, and/or any other system and/or service configured to implement embodiments of the disclosed systems and methods. As illustrated in FIG. 9, the system may include: a processing unit 902; system memory 904, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 902; a port 906 for interfacing with removable memory 908 that may include one or more diskettes, optical storage mediums (e.g., flash memory, thumb drives, USB dongles, compact discs, DVDs, etc.) and/or other non-transitory computer-readable storage mediums; a network interface 910 for communicating with other systems via one or more network connections 912 using one or more communication technologies; a user interface 914 that may include a display and/or one or more input/output devices such as, for example, a touchscreen, a keyboard, a mouse, a track pad, and the like; and one or more busses 916 for communicatively coupling the elements of the system. In certain embodiments, the system 900 may include and/or be associated with one or more sensors (not shown) configured to collect various device and/or user information.

In some embodiments, the system 900 may, alternatively or in addition, include an SPU 918 that is protected from tampering by a user of the system or other entities by utilizing secure physical and/or virtual security techniques. An SPU 918 can help enhance the security of sensitive operations such as personal information management, trusted credential and/or key management, privacy and policy management, and other aspects of the systems and methods disclosed herein. In certain embodiments, the SPU 918 may operate in a logically secure processing domain and be configured to protect and operate on secret and/or otherwise personal information, as described herein. In some embodiments, the SPU 918 may include internal memory storing executable instructions or programs configured to enable the SPU 918 to perform secure operations.

The operation of the system may be generally controlled by the processing unit 902 and/or an SPU 918 operating by executing software instructions and programs stored in the system memory 904 (and/or other computer-readable media, such as removable memory). The system memory 904 may store a variety of executable programs or modules for controlling the operation of the system 900. For example, the system memory 904 may include an operating system ("OS") 920 that may manage and coordinate, at least in part, system hardware resources and provide for common services for execution of various applications and a trust and privacy management system for implementing trust and privacy management functionality including protection and/or management of personal data through management and/or enforcement of associated policies. The system memory may further include, without limitation, communication software 922 configured to enable in part communication with and by the system, one or more applications 924, user and/or device information and/or other signal information 926, a Turing score generation module 928 configured to generate Turing scores associated with users and/or devices consistent with various aspects of the disclosed embodiments, a content and/or content parameter library 930, and/or a content selection module 932 consistent with various aspects of the disclosed embodiments, and/or any other information, modules, and/or applications configured to implement embodiments of the systems and methods disclosed herein.

The systems and methods disclosed herein are not inherently related to any particular computer, service, device, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method for managing distribution of content performed by a user verification system comprising a processor and a non-transitory computer readable storage medium storing instructions that, when executed by the processor, cause the processor to perform a method comprising:

receiving a first signal from a first device, the first signal being associated with a first user, the first signal comprising first monitoring information generated by monitoring the first user's interaction with the first device;

receiving a second signal from a second device, the second signal being associated with the first user, the second signal comprising second monitoring information generated by monitoring the first user's interaction with the second device;

generating a first user Turing score, the first user Turing score indicating a likelihood that the first user is a human user, the first user Turing score being generated based, at least in part, on the first monitoring information and the second monitoring information;

distributing a content item to a device associated with the first user; and generating feedback information, the feedback information comprising an indication of the content item and an indication of the first user Turing score, the indication of the first user Turing score comprising remuneration information generated based, at least in part, on the first user Turing score.

2. The method of claim 1, wherein the first signal is securely associated with the first device.

3. The method of claim 1, wherein the second signal is securely associated with the second device.

4. The method of claim 1, wherein at least one of the first monitoring information and the second monitoring information comprises user response time information.

5. The method of claim 1, wherein at least one of the first monitoring information and the second monitoring information comprises cursor movement information.

6. The method of claim 1, wherein the first monitoring information comprises first location information, the first location information indicating a location of the first device during a first interaction with the first user, and the second monitoring information comprises second location information, the second location information indicating a location of the second device during a second interaction with the first user.

7. The method of claim 1, wherein the device associated with the first user comprises at least one of the first device and the second device.

8. The method of claim 1, wherein the method further comprises accessing one or more parameters associated with the content item, the one or more parameters comprising at least one Turing score threshold.

9. The method of claim 8, wherein the method further comprises comparing the first user Turing score to the at least one Turing score threshold.

10. The method of claim 9, wherein the one or more parameters further comprise compensation information associated with the at least one Turing score threshold.

11. The method of claim 10, wherein the method further comprises generating the remuneration information based, at least in part, on the result of the step of comparing the first user Turing score to the at least one Turing score threshold.

12. The method of claim 11, wherein generating remuneration information is further based on the compensation information.

13. The method of claim 8, wherein the one or more parameters further comprise a condition associated with the at least one Turing score threshold.

14. The method of claim 13, wherein the condition associated with the at least one Turing score threshold indicates whether the content item is permitted to be distributed if the at least one Turing score threshold is met.

15. The method of claim 14, wherein the method further comprises comparing the first user Turing score to the at least one Turing score threshold.

16. The method of claim 15, wherein the method further comprises determining, based, at least in part, on the comparison of the first user Turing score and the at least one Turing score threshold, that the at least one Turing score threshold is met.

17. The method of claim 16, wherein the step of distributing the content item is further based on determining that the at least one Turing score threshold is met.

* * * * *